United States Patent Office 3,595,673
Patented July 27, 1971

3,595,673
HARD BUTTER COMPRISING RANDOMLY ESTERIFIED TRIGLYCERIDES OF $C_{12}$ AND $C_{16-18}$ FATTY ACIDS
Paul Seiden, Cincinnati, Ohio, assignor to The Procter & Gamble Company, Cincinnati, Ohio
No Drawing. Filed Sept. 12, 1968, Ser. No. 759,530
Int. Cl. A23d 5/00; C11c 3/02
U.S. Cl. 99—118                                   3 Claims

ABSTRACT OF THE DISCLOSURE

Hard butter comprising randomly esterified triglycerides containing certain amounts of $C_{12}$ and $C_{16-18}$ fatty acids exhibits an extremely rapid change in solids content at temperatures downward of its complete melting point.

BACKGROUND OF THE INVENTION

The field of this invention is confectioners' hard butter. Confectionery fats by definition include hard butters other than natural cocoa butter. These fats are employed in the manufacture of candy and cookie coatings, icings and fillings for candies, cookies and other confections.

Hard butter must have a very short softening range and a complete melting point which is below body temperature. It must remain firm and brittle at storage and ordinary room temperatures. The crystal and polymorphic stability of the product should make it suitable for shelf storage for six months to two years; its appearance and texture should not substantially change during storage. It is also important that hard butter have a controlled shrinkage rate during cooling so that satisfactory mold release can be obtained in making molded and solid confectionery bar goods such as chocolate candy bars. The flavor and odor of hard butter must be acceptable and the product must be compatible, at least to some extent, with natural cocoa butter, cocoa powder, chocolate liquor and other ingredients commonly used in the confectionery arts.

More specifically, the most important characteristic of hard butter is its solid content properties. It is desired to maximize the amount of solids present in the hard butter at temperatures close to and downward of the complete melting point but these solids should be lost as rapidly as possible as the melting point is approached; this provides the necessary firmness and brittleness and increases highly desirable "melt-in-the-mouth" characteristics.

The solids content referred to hereinabove is expressed at different temperatures in terms of a "Solids Content Index" (SCI) which is measured by what is essentially the test described in The Journal of the American Oil Chemists' Society, March 1954, volume XXXI, pages 98–103. The test involves a dilatometric measurement of the amount by which a fat expands when heated from a specific temperature to complete melting. Since this expansion is due to both a volume increase when solids change to liquids without a temperature change and a volume increase due to thermal expansion without change in phase from solid to liquid, allowance is made for the thermal expansion so that the change in volume gives a measure of the amount of solid phase present at the temperature of measurement. The test has been modified in that readings are taken after 30 minutes at the temperature of measurement.

Summarizing the above discussion in terms of SCI, a good hard butter should have a sharply sloped SCI versus temperature curve at temperatures close to and downward of its complete melting point, which point should be within the range of from about 90°–98° F.

Further background in the hard butter art is found in the following references:
British Pat. 879,211
U.S. Pat. 3,361,568
U.S. Pat 2,657,995
US. Pat 3494,944

SUMMARY OF THE INVENTION

The hard butter of the present invention is characterized by unique and advantageous solids content properties. Specifically, the hard butter of the invention has an SCI of at least 66 at a temperature 12° F. below its complete melting point, and said melting point is within the range of from about 90° F. to about 98° F. The hard butter thus has a very sharply sloped SCI curve at temperatures close to and downward of the melting point. Solids are lost rapidly as the melting point is approached providing a significantly improved "melt-in-the-mouth" sensation as compared to known hard butters.

Hard butter having the above-described characteristics is achieved in accord with the present invention with a randomly esterified triglyceride containing certain amounts of $C_{12}$ and $C_{16-18}$ fatty acids. More specifically, the invention provides a novel hard butter having an SCI of at least 66 at a temperature 12° F. below its complete melting point, said melting point being from about 90° F. to about 98° F., which comprises randomly esterified triglyceride having a fatty acid content comprising from about 75% to about 93% saturated $C_{12}$, and from about 5% to about 25% saturated $C_{16-18}$.

DESCRIPTION OF THE PREFERRED EMBODIMENTS

The hard butter of the present invention is a randomly esterified triglyceride having a fatty acid content comprising from about 75% to about 93% saturated $C_{12}$ (lauric acid), and from about 5% to about 25% saturated $C_{16-18}$ (palmitic acid, stearic acid, and mixtures thereof). Since technical grades of lauric, palmitic, and stearic acid are often conveniently used, the fatty acid composition of the triglyceride can contain up to about 10% total of $C_{14}$, $C_8$, and $C_{10}$ fatty acids. The triglyceride is preferably substantially free from $C_{20}$ or higher fatty acids and preferably contains no more than about 5% $C_{14}$ fatty acid. A preferred fatty acid composition comprises from about 78% to about 85% saturated $C_{12}$ and from about 15% to about 22% saturated $C_{16}$.

Random esterification of the triglyceride with the specified fatty acids is an essential part of this invention. It has been discovered that mere physical blends, e.g., of 80% trilaurin and 20% tripalmitin, do not provide hard butter having the desired SCI curve, and especially a curve wherein the SCI is at least 66 at a temperature 12° F. below the complete melting point. The hard butter can, of course, be physically combined with other triglycerides in order to tailor the complete properties of the fat as desired. These triglycerides can be normal or randomized and are preferably of the lauric type.

The triglyceride hard butter of the invention an be readily prepared by conventional random transesterification, interesterification, or rearrangement reactions between, for example, trilaurin and tripalmitin, trilaurin and palmitic acid, or trilaurin and substantially completely hydrogenated palm oil. See, Bailey's Industrial Oil and Fat Products, 3rd ed., pages 946–965.

A suitable method for preparing a random triglyceride of the specified fatty acid content is to interesterify trilaurin with tripalmitin and/or tristearin in the proper proportions according to the process of Burgers et al. as disclosed in U.S. Pats. 3,170,798, Feb. 23, 1965. Commercially available technical grade lauric acid or trilaurin, each of which has a fatty acid composition of about 95.4% $C_{12}$, 3.4% $C_{16}$, and 1% $C_{10}$, are useful materials as the source for $C_{12}$ fatty acid.

Excellent results are obtained by incorporating the randomly esterified triglyceride hard butter prepared in accordance with this invention into chocolate-type coatings, icings, and confectioners coatings. The ranges of typical coating formulations used in chocolate-type coatings are shown below, where the figures are expressed in percent.

CHOCOLATE COATING FORMULATIONS

|  | Dark compound | Light compound |
| --- | --- | --- |
| Hard butter | 20-35 | 20-35 |
| Cocoa | 10-30 | 0-10 |
| Skim milk powder | 6-8 | 6-15 |
| Sugar (4X or slightly coarser in grind) | 40-50 | 40-60 |
| Salt | 0.20-3 | 0.2-3 |
| Vanillin | 0.10-1 | 0.10-1 |
| Lecithin | 0.30-3 | 0.30-3 |

The above compositions can be prepared as follows: All the ingredients are measured and combined with the exception of about one-half of lecithin and a small portion, about 2% to 4% of the hard butter. After blending, the temperature of the mix is 120° to 145° F. The blend is refined to reduce the particle size to a range between 25 and 40 microns. The coating is placed in storage tanks, at temperature of 135° to 145° F. for about 24 hours, during which time it is stirred in order to lower the viscosity and reach a constant viscosity value. The residual portions of 2% to 4% hard butter and lecithin are then added for the purpose of further lowering the viscosity. The coating is then tempered and can be molded into blocks, or kept in the melted state. It is shipped either in the solid or melted form and is stable over a long period.

A white coating can be prepared by blending 33 lbs. of a randomly esterified triglyceride hard butter prepared in accordance with the invention, 18 lbs. of milk solid powder, 49 lbs. of fine sugar, 3 oz. of salt, ½ lb. of vanilla and 2.5 oz. of lecithin. The product is very satisfactory.

Additional compositions utilizing the hard butter of the invention are illustrated in the example, infra.

The randomly esterified triglyceride hard butter of the present invention (and any confectionery product prepared therefrom) has highly desirable solids content properties. The hard butter of the invention has an SCI of at least 66 at a temperature 12° F. below its complete melting point, and said melting point is within the range of from about 90° F. to about 98° F. The hard butter thus has a very sharply sloped SCI curve at temperatures close to and downward of the melting point. Solids are lost rapidly as the melting point is approached providing a significantly improved "melt-in the mouth" sensation when eaten as compared to known hard butters. Preferably, the complete melting point of the hard butter is within the range of from about 90° F. to about 94° F. and the SCI is at least 50 at a temperature 6° F. below the complete melting point.

In addition to the above-described solids content properties, the hard butter of the invention remains firm and brittle at storage and ordinary room temperatures and is suitable for shelf storage for six months to two years. The hard butter has good mold release properties and a satisfactory flavor and odor. Compatibility of natural cocoa butter, cocoa powder, chocolate liquid and other ingredients commonly used in the confectionery arts is at least as good with the hard butter of the present invention as with other known hard butters.

Prepared coatings made from the hard butter of the invention show fast "melt-in-the-mouth" properties (as noted above) and better snap (brittleness-firmness) at room temperature than real chocolate coatings. Moreover, such coatings have excellent gloss retention properties.

EXAMPLE 82 lbs. of technical grade lauric acid (95.4% $C_{12}$, 3.4% $C_{16}$, 1% $C_{10}$), 18 lbs. palmitic acid, and 15 lbs. glycerine were charged to a stainless steel deodorizer equipped with a refluxing condenser. Refluxing, with agitation by nitrogen sparging, for 2 hours at 500 mm. Hg and 255° C. produced a ramdomly esterified triglyceride having a fatty acid composition of 78% saturated $C_{12}$, 21.2% saturated $C_{16}$ and 0.8% saturated $C_{10}$. The esterification was followed with conventional deodorization at 5 mm. Hg absolute pressure and 220° C. The randomly esterized triglyceride was cooled to 50° C. and discharged to yield a product having the following analytical data:

Free fatty acid—0.050%
Monoglyceride content—0.28%
Hydroxyl value—19.8
Complete melting point—91° F.
SCI (80° F.)
    at 80° F.—69.2
    At 86° F.—51.3
    At 92° F.—0.0

It can be seen from the above data that the randomly esterified triglyceride hard butter had an SCI of at least 66 at a temperature 12° F. below its melting point and an SCI of at least 50 at a temperature 6° F. below its melting point. For comparative purposes, a typical hard butter obtained by corandomizing 90% palm kernel oil having an iodine value of 0.7 and 10% rapeseed oil having an iodine value of 2.5 was prepared. Data for the comparative hard butter as well as that for real cocoa butter are shown below:

|  | Comparative hard butter | Cocoa butter |
| --- | --- | --- |
| Complete melting point, °F | 103 | 94 |
| SCI (80° F.) at— |  |  |
| 80° F | 46.0 | 75 |
| 86° F |  | 50.4 |
| 92° F | 15.8 | 0 |
| 98° F | 4.1 |  |

Thus, in terms of solids content properties, the randomly esterified triglyceride hard butter of the present invention is substantially better than a typical hard butter and is at least equal to real cocoa butter.

"Arizona" and conventional milk confectioners coatings are prepared and evaluated using both the invention hard butter and the typical hard butter disclosed above as the principal fat ingredients. These coatings are prepared by mixing the following ingredients in the manner described below.

| Ingredients | A "Arizona," percent | B Milk, percent |
| --- | --- | --- |
| Granulated sugar | 42 | 52.32 |
| Cocoa | 23 |  |
| Chocolate liquor |  | 10.00 |
| Hard butter | 35 | 25.00 |
| Cocoa butter |  |  |
| Whole milk powder |  | 12.00 |
| Salt |  | .12 |
| Vanillin |  | .06 |
| Lecithin |  | .50 |

The dry ingredients are mixed together in a stainless steel bowl by hand mixing. The hard butter, chocolate liquor and lecithin are melted and slowly added to the dry ingredients while they are being continuously mixed at 140° F. with an electric mixer at medium speed. The mixtures are then allowed to cool at room temperature with occasional hand stirring while the consistency of the confection noticeably thickens. When the mixture is partially set it is twice run through a four-roll stainless steel mill in order to reduce the particle size of sugar.

The resultant confectioners coatings are evaluated for their performance characteristics and the coatings prepared with the invention hard butter are judged to be superior in many respects. In a conventional "snap" test, the coating containing the invention hard butter exhibits more snap at 85° F. than the coating containing typical hard butter. The eating quality of the two bars are compared on a scale of 1 to 10; 10 being superior. The eating quality of the bar containing the invention hard butter is judged to be a 7 or greater, and the eating quality of the typical hard butter bar is judged a 6. The gloss retention of the milk coating is measured in a standardized test utilizing a photovolt reflectometer. The percent loss on bars molded from both coatings is then determined. The initial percent gloss on the bar molded from the invention hard butter is about the same as the initial gloss of the bar molded from the typical hard butter. These bars are cycled between 90° F. for four hours and 60° F. storage for eight hours, after which time the gloss on each bar is again measured. The gloss is measured after each cycle until the sample reads 0% or has "bloomed." Only two cycles are required until the sample bar containing the typical hard butter had bloomed. Several more cycles than this are necessary to cause bloom on the bar made with the invention hard butter.

I claim:

1. Hard butter having an SCI of at least 66 at a temperature at least 12° F. below its complete melting point, said melting point being from about 90° F. to about 98° F., which consists essentially of:

randomly esterified triglyceride having a fatty acid content consisting essentially of from about 75% to about 93% saturated $C_{12}$ and from about 5% to about 25% saturated $C_{16-18}$; and containing no more than about 10% total of $C_{14}$, $C_8$, and $C_{10}$, fatty acids, no more than about 5% $C_{14}$ fatty acid, and which is substantially free of $C_{20}$ or higher fatty acids.

2. The hard butter of claim 1 wherein the fatty acid content consisting essentially of from about 78% to about 85% saturated $C_{12}$ and from about 15% to about 22% saturated $C_{16}$.

3. The hard butter of claim 2 wherein the complete melting point is within the range of from about 90° F. to about 94° F. and the SCI is at least 50 at a temperature 6° F. below the complete melting point.

References Cited

UNITED STATES PATENTS

| | | | |
|---|---|---|---|
| 2,657,995 | 11/1953 | Blum | 99—118 |
| 2,726,158 | 12/1955 | Cochran et al. | 99—118 |
| 2,783,151 | 2/1957 | Cochran et al. | 99—118 |
| 3,393,037 | 8/1968 | Bell et al. | 99—118 |
| 3,361,568 | 1/1968 | Kidger | 99—118X |
| 3,494,944 | 2/1970 | Seiden | 99—118X |

JOSEPH M. GOLIAN, Primary Examiner

U.S. Cl. X.R.

260—410.7

PO-1050
(5/69)

UNITED STATES PATENT OFFICE
CERTIFICATE OF CORRECTION

Patent No. 3,595,673            Dated    July 27, 1971

Inventor(s)  Paul Seiden

It is certified that error appears in the above-identified patent and that said Letters Patent are hereby corrected as shown below:

Column 2 - line 59 "an" should read -- can --.

Column 4 - line 8 "esterized" should read -- esterified --.

Column 4 - Table, "86°F ..... 50.4" - should read
          -- 86°F ...... 40.5 --.

Signed and sealed this 18th day of January 1972.

(SEAL)
Attest:

EDWARD M.FLETCHER,JR.          ROBERT GOTTSCHALK
Attesting Officer              Acting Commissioner of Patents